C. F. JUDSON.
LAWN MOWER SHARPENER.
APPLICATION FILED DEC. 18, 1914.
1,152,736.
Patented Sept. 7, 1915.
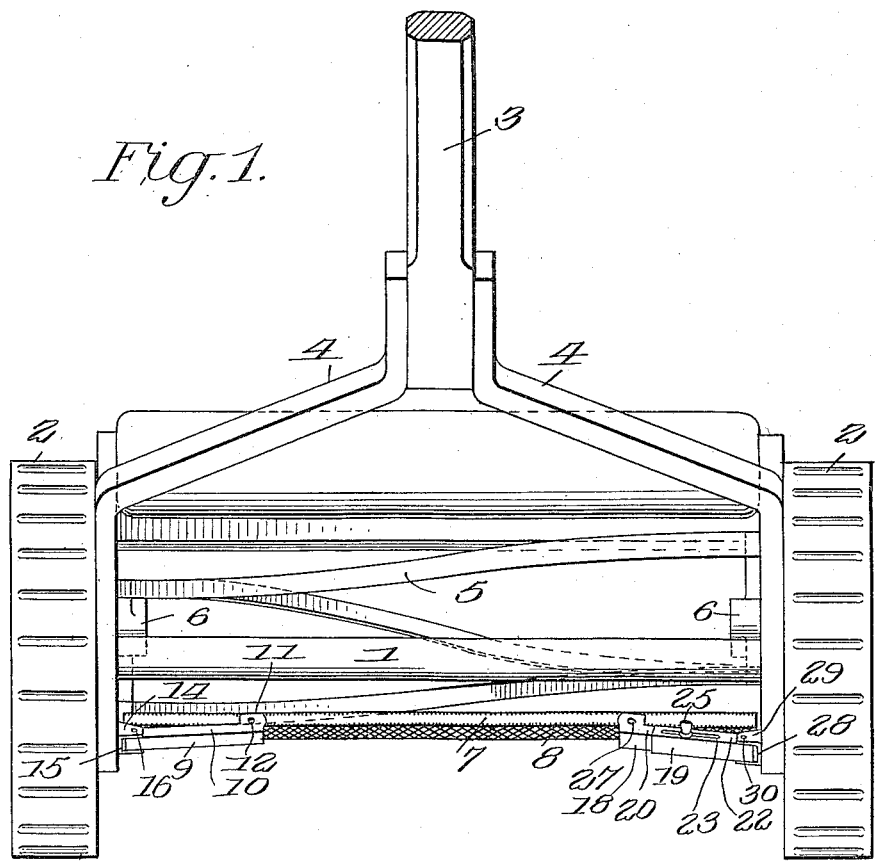
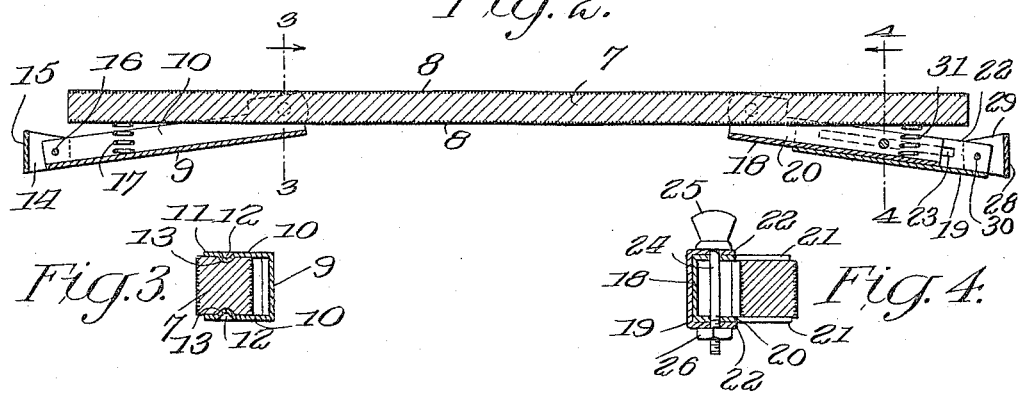
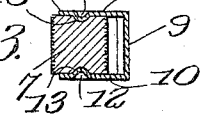
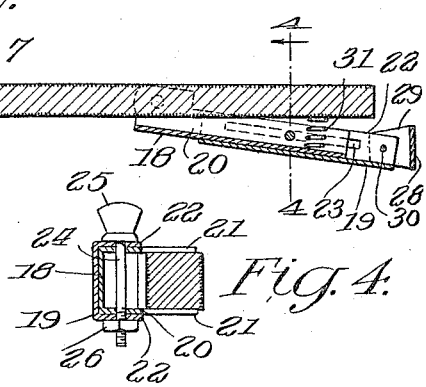
WITNESSES
INVENTOR
Charles F. Judson,
BY Munn & Co.
ATTORNEYS

UNITED STATES PATENT OFFICE.

CHARLES F. JUDSON, OF EAGLE, IDAHO.

LAWN-MOWER SHARPENER.

1,152,736.  Specification of Letters Patent.  Patented Sept. 7, 1915.

Application filed December 18, 1914. Serial No. 877,896.

*To all whom it may concern:*

Be it known that I, CHARLES F. JUDSON, a citizen of the United States, and a resident of Eagle, in the county of Ada and State of Idaho, have made certain new and useful Improvements in Lawn-Mower Sharpeners, of which the following is a specification.

My invention is an improvement in lawn mower sharpeners and has for its object to provide a device of the character specified, designed to be attached to the ordinary mower of the character specified, and having means for permitting the said device to be attached to any mower regardless of the width of the cut, and having a plurality of engaging surfaces and so arranged that either of the said surfaces may be brought into action, and wherein the sharpening action takes place as the mower is run over the ground in the ordinary manner of cutting the grass.

In the drawing: Figure 1 is a top plan view of a lawn mower, with the improved sharpener in place. Fig. 2 is a longitudinal section of the device, and Figs. 3 and 4 are sections on the lines 3—3 and 4—4 respectively, of Fig. 2.

The present embodiment of the invention is shown in connection with a lawn mower of the ordinary type, having the axle 1, to which are secured the wheels 2, and the handle 3 is connected to the wheels by means of the usual bracket arms 4, each arm having one end connected to the handle and the other to the supporting frame of the mower.

The cutting mechanism is of the usual form, comprising the blades 5 arranged substantially spiral with respect to the shaft 1, the said blades being spaced radially from a common axis and spaced at regular angular intervals with respect to each other. The blades are connected to the hubs 6 in the ordinary manner, and are rotated by the movement of the wheel.

The sharpening device comprises a file 7 of square cross section, and having opposite faces formed to cut, as shown at 8. The file is connected with the supporting frame of the mower, in which the shaft 1 is journaled, by means of a plurality of connecting devices shown in Figs. 2 to 4. One of the said devices comprises a channel shaped link, the said link having a body 9 and side flanges 10, the said flanges being parallel and being spaced apart from each other a sufficient distance to receive the file 7 between the same.

Each of the flanges at the end adjacent to the file is provided with an extension 11, and at the said extension each of the flanges 10 of the link is provided with an indentation on its outer faces, the said indentation forming a boss 12 on the inner face of the arm.

At the end adjacent to the link 9—10 the file is provided with recesses or depressions 13 on the faces of the file not provided with teeth, and the said depressions or recesses are adapted to be engaged by the bosses 12. The opposite end of the link 9—10 is received between the arms 14 of a U-shaped bracket, the bracket comprising a body 15 and the arms 14. The body of the bracket is secured to the adjacent end of the supporting frame of the mower to which the wheels are connected, and the arms 14 of the bracket extend inwardly, as shown in Fig. 1.

A pin 16 is passed through the arms and the flanges of the link, to pivotally connect the link to the bracket. The bracket 14—15 is spaced away from the blade and a coil spring 17 is arranged between the outer face of the file and the body 9 of the link, the said spring being between the flanges 10 of the link, and the said spring acts normally to hold the file in the position shown in Fig. 2 with respect to the link.

The opposite end of the file is supported by a similar mechanism, but the link is sectional to provide for different sized mowers. The said link is channel shaped, consisting of sections 18 and 19 respectively. The section 18 is provided with the lateral flanges 20 extending parallel and in spaced relation, and each of the said flanges is provided at the end adjacent to the file with an extension 21, the said extensions engaging opposite faces of the file. The other section 19 of the link is also provided with lateral flanges 22, and the said flanges fit outside the flanges 20 of the first named section.

The body 19 of the last named section of the link is also outside of the body 18 of the first named link, and each of the flanges 22 of the last named section of the link is provided with a longitudinally extending slot 23. The first named section 18 is provided with openings registering with the slot 23, and a bolt 24 is passed through the registering opening and slot.

The bolt is provided with a head 25, the said head engaging one flange 22, and a nut 26 is threaded on to the other end of the bolt, the nut engaging the other flange 22 of the last named section. By loosening the nut 26, the sections of the link may be moved toward or from each other, and may be held in adjusted position by tightening the nut.

Each of the flanges 20 of the first named section of the link is provided with an indentation on its outer face forming a boss on its inner face, the said boss 27 corresponding in all respects to the boss 12, before mentioned, and the file is provided with recesses or depressions for receiving the said bosses. The recesses for receiving the boss 27 are precisely the same as those shown in Fig. 3 and are not more particularly shown for this reason.

The outer end of the last named section of the sectional link is pivoted to a substantially U-shaped bracket, the said bracket comprising a body 28 and arms 29. The body 28 of the bracket is secured to the supporting frame connected to the wheels, in the same manner as is the body of the bracket 14—15, and arms 29 on the bracket extend on opposite sides of the outer section of the link, as shown in Fig. 1, and a pivot pin 30 pivotally connects the outer section of the link to the said bracket arm.

A coil spring 31 is arranged between the last described link and the adjacent face of the file, the said spring engaging the outer face of the file at one end and the inner face of the body 18 of the inner section of the link at the other end and the said spring acts normally to hold the file in the position of Fig. 2, with respect to the link.

In operation, the device is arranged as shown in Fig. 1, with one of the cutting faces of the file in such position that as the cutting reel revolves the blades will engage the said cutting face of the file with their cutting edges in succession, and the said cutting edges of the file will grind away the blade at the proper angle.

The device may be left on the mower, if desired, or may be detached and connected with another mower. The brackets 14—15 and 28—29 are permanently connected with the supporting frame of the mower. The springs 17 and 31 normally hold the cutting face of the file in engagement with the cutting edges of the blade, but the springs may yield to provide a yielding support for the file.

When the file becomes worn on one face, it may be turned to bring another face into position, and it is obvious that by providing the indentations 13 on the four faces of the file, a file having four cutting faces might be used. The cutting faces of the file may be of any desired degree of coarseness or fineness, and the said file will be made of a length to suit the mower. While one of the supporting links is sectional, it is obvious that the file must be at least as long as the projection of the cutting blade, otherwise every part of the cutting edge of the blade could not engage the cutting face of the file.

The device is simple and may be constructed at a very low cost. It is easily adjusted, and once adjusted, may be left in position. After the blades have been sharpened to a sufficient extent, the file may be removed, if desired.

I claim:—

1. A sharpener for lawn mowers comprising a file or bar of approximately rectangular cross section having alternate file or cutting faces, and means in connection with the file for connecting the file to a lawn mower with the long axis of the file parallel with the axis of rotation of the blades of the mower, said means comprising a pair of U-shaped brackets, each consisting of a body adapted for connection with the mower, and arms extending approximately parallel from the body, a link for connecting the arms of each bracket to the adjacent end of the bar, each link being of channel shape and comprising a body and flanges extending laterally from the body in the same direction, the arms of each bracket being pivoted to the flanges of the adjacent link at the outer end thereof, and the bar having a pair of oppositely arranged indentations on the plain faces thereof near each end, the flanges of each link having bosses on their inner faces for engaging the indentations, said bosses being at the inner end of the link, and a spring arranged between the body of each link and the bar, between the pivotal connections of the link and the adjacent end of the bar, the springs normally holding the links inclined with respect to the bar, one of the links being sectional, and the sections being slidable with respect to each other, and means for securing the sections in adjusted position.

2. A sharpener for lawn mowers comprising a file or bar of approximately rectangular cross section having alternate file or cutting faces, and means in connection with the file for connecting the file to a lawn mower with the long axis of the file parallel with the axis of rotation of the blades of the mower, said means comprising a pair of U-shaped brackets, each consisting of a body adapted for connection with the mower, and arms extending approximately parallel from the body, a link for connecting the arms of each bracket to the adjacent end of the bar, each link being of channel shape and comprising a body and flanges extending laterally from the body in the same direction, the arms of each bracket being pivoted to the flanges of the adjacent link at the outer end thereof, and the bar having a pair of oppositely arranged indentations on the plain faces thereof near each end, the flanges of each link having bosses on their inner faces for engaging the indentations, said bosses being at the inner end of the link, and a spring arranged between the body of each link and the bar, between the pivotal connections of the link and the adjacent end of the bar, the springs normally holding the links inclined with respect to the bar, one of the links being sectional, the sections being adjustable with respect to each other.

3. A sharpener for lawn mowers comprising a file or bar of approximately rectangular cross section having alternate file or cutting faces, and means in connection with the file for connecting the file to a lawn mower with the long axis of the file parallel with the axis of rotation of the blades of the mower, said means comprising a pair of U-shaped brackets, each consisting of a body adapted for connection with the mower, and arms extending approximately parallel from the body, a link for connecting the arms of each bracket to the adjacent end of the bar, each link being of channel shape and comprising a body and flanges extending laterally from the body in the same direction, the arms of each bracket being pivoted to the flanges of the adjacent link at the outer end thereof, and the bar having a pair of oppositely arranged indentations on the plain faces thereof near each end, the flanges of each link having bosses on their inner faces for engaging the indentations, said bosses being at the inner end of the link, and a spring arranged between the body of each link and the bar, between the pivotal connections of the link and the adjacent end of the bar, the springs normally holding the links inclined with respect to the bar.

4. A sharpener for lawn mowers comprising a file or bar having cutting faces, a link pivoted to the bar near each end thereof and at the inner end of the link, a bracket pivoted to the outer end of each link for attachment to the lawn mower frame, each link extending beyond the adjacent end of the bar, and a spring arranged between each link and the bar normally holding the link inclined with respect to the bar, one of the bars being sectional and the sections being adjustable with respect to each other.

CHARLES F. JUDSON.

Witnesses:
JAMES H. LOME,
CHARLES B. COXE.

Copies of this patent may be obtained for five cents each, by addressing the "Commissioner of Patents, Washington, D. C."